United States Patent [19]

Kerekes

[11] Patent Number: 4,699,241

[45] Date of Patent: Oct. 13, 1987

[54] METHOD AND APPARATUS FOR DETONATION OF DISTRIBUTED CHARGES

[75] Inventor: Albin K. Kerekes, Thousand Oaks, Calif.

[73] Assignee: Atlantic Richfield Company, Los Angeles, Calif.

[21] Appl. No.: 791,096

[22] Filed: Oct. 24, 1985

[51] Int. Cl.⁴ .................... G01V 1/08; G01V 1/00; F23Q 21/00

[52] U.S. Cl. .................... 181/116; 102/217; 102/218; 181/103; 181/107; 367/14

[58] Field of Search .......... 102/305, 306, 310, 311, 102/312, 317, 318, 217, 218; 181/103, 106, 107, 111, 116; 367/14, 55, 56, 57, 145; 340/385, 386

[56] References Cited

U.S. PATENT DOCUMENTS

| | | | |
|---|---|---|---|
| 2,908,342 | 10/1959 | Itria et al. | 181/111 |
| 2,922,484 | 1/1960 | Kelly et al. | 181/107 |
| 3,050,149 | 8/1962 | Itria et al. | 181/107 |
| 3,102,476 | 9/1963 | Naeseth | 102/311 |
| 3,196,974 | 7/1965 | Burnes, Jr. | 200/61.01 |
| 3,687,228 | 8/1972 | Morns | 181/116 |
| 3,805,115 | 4/1974 | Heckelman | 102/311 |
| 3,987,729 | 10/1976 | Andrews et al. | 102/312 X |
| 4,313,380 | 2/1982 | Martner et al. | 181/116 |
| 4,324,310 | 4/1982 | Wener et al. | 181/106 X |
| 4,496,010 | 1/1985 | Chapman, III | 102/317 X |

Primary Examiner—Deborah L. Kyle
Assistant Examiner—Brian S. Steinberger
Attorney, Agent, or Firm—Drude Faulconer

[57] ABSTRACT

A seismic geophysical prospecting method and apparatus is described involving the sequential shooting of lump explosive charges spaced apart in a borehole so as to produce seismic wave reinforcement in a given direction. Fast acting electronic switch means control the detonation of each charge responsive to the advance of the seismic waves front substantially independent of formation pressure wave velocity.

5 Claims, 5 Drawing Figures

METHOD AND APPARATUS FOR DETONATION OF DISTRIBUTED CHARGES

BACKGROUND OF THE INVENTION

1. Field of the Invention

This invention relates generally to the field of seismic geophysical prospecting and more particularly to the sequential detonation of a plurality of lump explosive charges located at spaced intervals within a bore hole.

2. Prior Art

The detonation of distributed charges within a bore hole in the practice of seismic surveying through what is termed "sequential shooting" is well known. Distributed charges may assume the form of an elongated explosive cord or alternatively, they may consist of lump explosive charges at spaced intervals. This invention is concerned with the latter type.

In this art, the concept is to fire the lump explosive charges at intervals such that the associated seismic wave fronts reinforce each other in a given direction, normally down the shot hole. To do this, the array of charges is detonated from the top charge downwardly and the timing between successive detonations is made equal to the time of travel of the seismic waves along the formation between successive charges.

One form of apparatus for carrying out this technique relies upon sequentially energizing a series of pressure actuated switches in response to the arrival of a downwardly advancing seismic wave front produced by the detonation of the first charge. As each switch is energized, a detonator or blasting cap is set off so as to fire the associated explosive charge. Such an apparatus is described in U.S. Pat. No. 3,196,974 issued on July 27, 1965 to V. M. Barnes. According to the Barnes patent, each charge detonating circuit or "phaser" is activated by the operation of a mechanical switch. The switch incorporates a metallic diaphragm which moves responsive to a seismic wave front so as to contact a centrally located member to produce switch closure. Each pressure responsive switch is located at a predetermined distance away from the explosive charge to be detonated by its closure. This distance is designed to compensate for the time it takes for switch closure to occur after the arrival of the seismic wave front. In this way, in accordance with the patent, the pressure wave will not have traveled past the charge to be detonated before this event occurs. Thus, reinforcement is said to be achieved between each seismic pressure wave front and the succeeding one.

A disadvantage of devices of this character is that they are dependent upon formation seismic velocity. In order to accurately position the pressure sensor in relation to the associated detonator, the formation accoustic velocity governing the advancement of the seismic wave front from charge to charge must be accurately known. Furthermore, this spacing must be varied to accomodate the fact that differing formations will have differing seismic velocities. In addition, the very fact that there must be some significant spacing between the pressure sensor and the detonator imposes a limitation on the design and physical character of the apparatus. Beyond the above problems is the further complication that the behavior of seismic shock waves in the "near field", i.e., the immediate vicinity of an explosion, is difficult to interpret and analyze precisely as to wave form and velocity. These near field shock wave characteristics are typically quite different from the relatively stable acoustic behavior of the formation when measured remote from the source in what is termed the "far field". For this reason, assumptions concerning formation velocity should be regarded with considerable skepticism as applied to the design and operation of distributed charge apparatus.

Since the requisite time delay between successive distributed charges is likely to be on the order of a few micro-seconds, a further disadvantage of the use of mechanical switches in the context described above is their inherent lack of precise repeatability. This is due to metal fatigue, temperature and humidity effects, bore hole depth and other environmental factors.

SUMMARY OF THE INVENTION

It is therefore a general object of this invention to provide an improvemed apparatus for sequentially detonating distributed lump explosive charges in a bore hole in order to achieve seismic wave reinforcement in a given direction.

It is a more particular object of this invention to provide such a method and apparatus with improved accuracy and repeatability.

It is a still further object of this invention to provide such a method and apparatus which is substantially independent of formation seismic velocity and that requires no adjustment for variations in such velocity.

In accordance with a preferred embodiment of this invention an apparatus for sequentially detonating a plurality of distributed lump explosive charges in a bore hole incorporates a like plurality of phased firing circuits or "phasers". Briefly, each phaser comprises a capacitor interconnected in series with a detonator through a normally open electronic switch. The detonator is attached to a respective one of said charges. A fuse is placed across the capacitor to prevent its' accidental polarization. To arm the phasers, after the explosive charges are loaded into the hole, the capacitor of each phaser is charged by sending current from a power source located at the surface of the earth. This capacitor charge will furnish B+ voltage for the electronic switch.

In operation, an explosion is conventionally initiated at the top of the borehole. A fast-acting piezoelectric pressure-sensitive element isolated from the capacitor discharge circuit, but positioned arbitrarily close to the detonator, generates a voltage transient when the resultant downwardly advancing seismic wave front impinges on such element. The voltage transient is passed through a time delay substantially equal to the rise time to peak pressure of the dominant frequency of such seismic wave front and is then adapted to actuate the electronic switch. This completes the capacitor discharge circuit and fires the detonator which initiates the charge to which it is connected substantially simultaneously with the arrival at such detonator of the peak amplitude of the seismic wave front. Sequential activation of successive phasers in this manner successively reinforces the advancing seismic wave front.

In its preferred embodiment, the invention also includes the method of sequentially detonating a plurality of distributed lump explosive charges in a bore hole wherein the detonation of each such charge is accomplished by the steps of producing a fast rising voltage pulse responsive to the impingement upon a piezo-electric pressure-sensitive element of a downwardly expanding seismic wave front, and utilizing said voltage pulse to close an electronic switch which completes a capacitor discharge circuit adapted to detonate said charge, said voltage pulse having been subjected to a time delay such that the peak amplitude of such wave front reaches said detonator substantially simultaneously with its explosion.

Other and further objects and advantages of this invention will become apparent from a consideration of the detailed description to follow taken in conjunction with the drawings and appended claims.

DETAIL DESCRIPTION OF THE PREFERRED EMBODIMENTS

Figure 1:
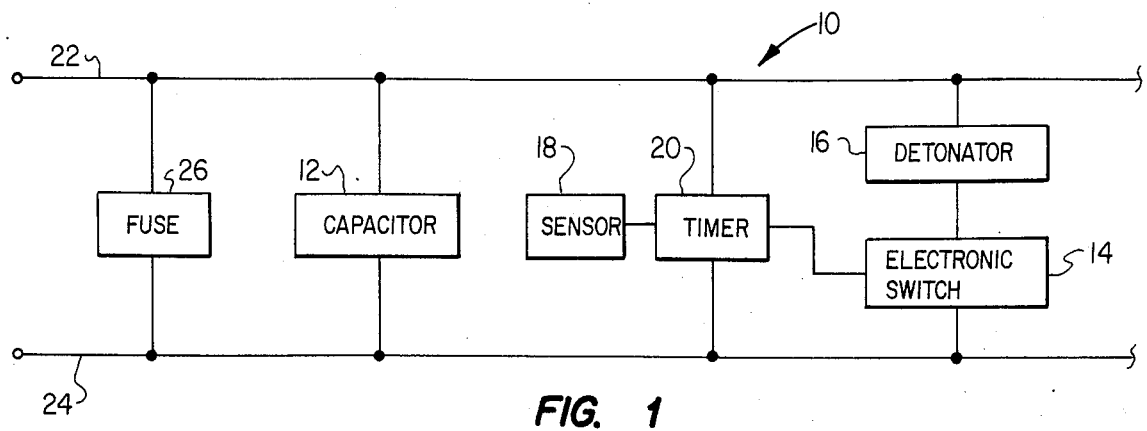
FIG. 1 illustrates in block diagrammatic form, a phaser circuit for a distributed charge apparatus in accordance with the preferred embodiment of this invention.

Referring now to FIG. 1, there is illustrated in block diagram form a phaser circuit 10, a plurality of which may be interconnected to form a distructible distributive charge apparatus for generating seismic waves in accordance with this invention.

In each phaser circuit 10 a capacitor 12 is interconnected through an electronic switch 14 with a detonator 16. A pressure activated electro acoustic sensor 18 is connected to switch 14 through a delay timer 20.

Figure 5:
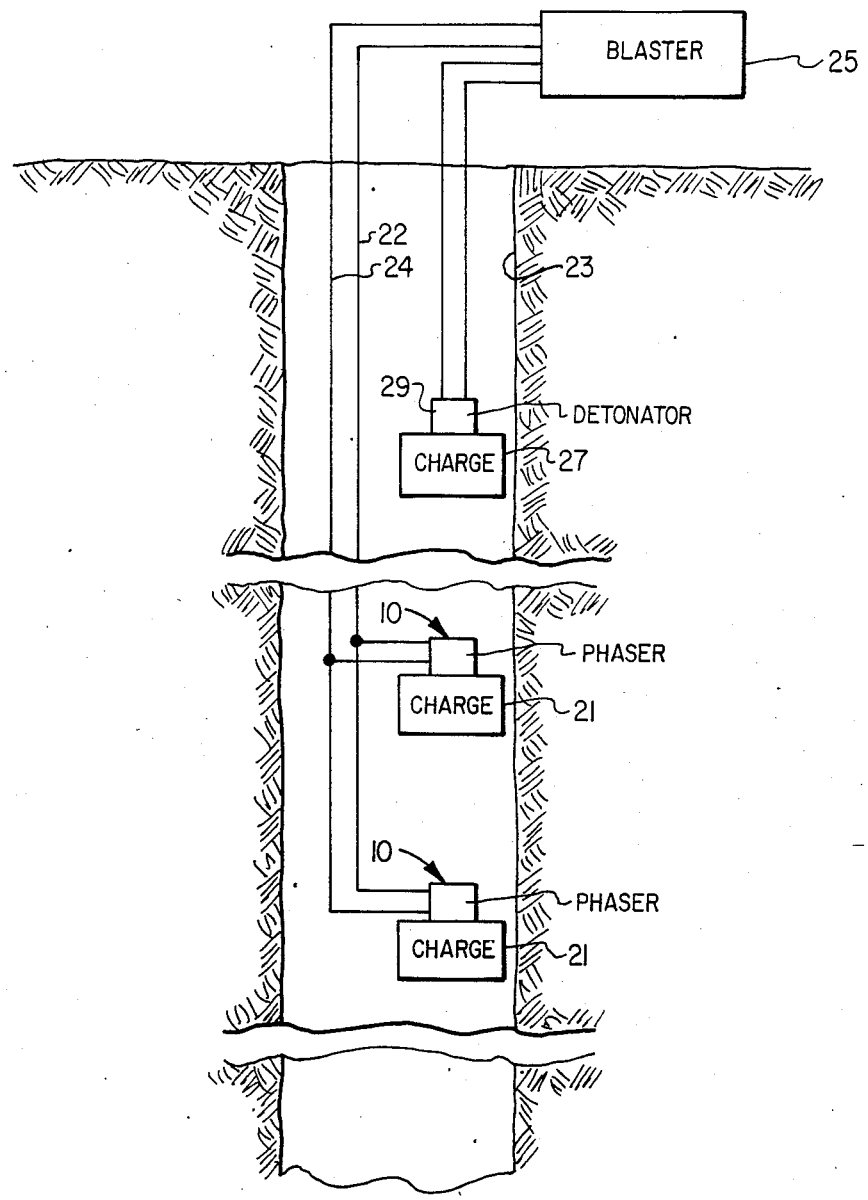
FIG. 5 is a diagrammatic vertical section of a shothole in the earth incorporating apparatus in accordance with this invention.

When the multiple lump explosive charges 21 which make up the distributive charges of this apparatus are loaded into a shot hole 23, as best seen in FIG. 5, each such charge 21 has a phaser 10 attached to it which is connected to a common pair of charging wires 22 and 24 leading to a blaster 25 at the surface of the earth. Each detonator 16 is designed to initiate one such charge 21.

After the lump charges 21 are loaded into shot hole 23, a current is sent from blaster 25 which burns through each of fuses 26, which are respectively positioned across capacitors 12 to prevent their accidental polarization. Capacitors 12 are then charged and each phaser circuit 10 is thereby armed. A top most explosive charge 27 in shot hole 23 is provided with detonator 29. Through conventional connections to blaster 25, detonator 29 may be fired, initiating a pressure field whose down going wave form cuts charging wires 22 and 24. By this time, however, phaser circuits 10 are functioning independently.

When the advancing wave front reaches each sensor 18, a fast rising voltage transient is generated which, after a preselected time delay established by timer 20, triggers switch 14 into operation. This causes capacitor 12 to discharge through detonator 16 and initiates its associated lump explosive charge 21. The time delay introduced by timer 20 in each phaser circuit 10 is selected such that the initial pressure wave front is successively reinforced in a downhole direction with the sequential explosion of each of the multiple lump charges 21 to which phaser circuits 10 are attached. Since sensor 18 may be placed arbitrarily close to detonator 16, this time delay is essentially independent of formation seismic velocity. Its purpose, as will be explained in more detail later, is to permit the surrounding pressure field to reach its peak amplitude at the precise time detonation occurs.

Figure 2:
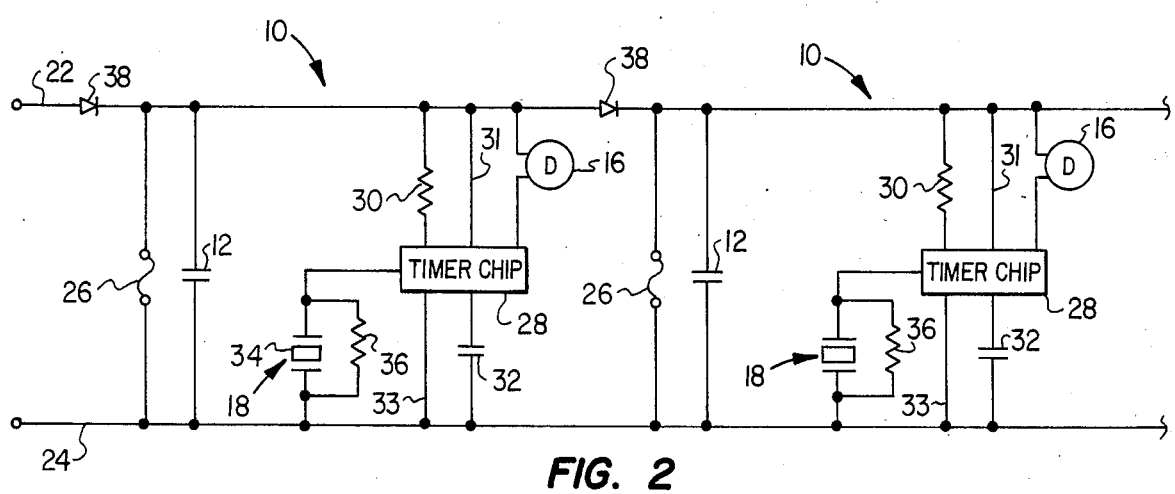
FIG. 2 is a phaser circuit diagram in accordance with the embodiment of FIG. 1.

FIG. 2 illustrates diagrammatically a preferred embodiment of two adjacent interconnected phaser circuits 10 each functionally equivalent to the circuit of FIG. 1. The functions of electronic switch 14 and timer 20 of FIG. 1 are preferably accomplished by an integrated circuit timer chip 28, together with external resistor 30 and capacitor 32. While not to be regarded as limiting, chip 28 may be a National Semiconductor LM555 Timer Chip, which comprises a delay generator, a threshold trigger circuit and a transistor switch. Capacitor 12 provides B+ voltage supply to chip 28, when required, through lead 31, with ground connection being made through lead 33. The operation of chip 28 is well known to those skilled in the art and therefore unnecessary to detail here. The time delay introduced by timer chip 28 is expressed as $1.1 R_a C$ where $R_a$ = Resistor 30 and C = Capacitor 32, at the end of which time the voltage V generated by sensor 18, is sufficient to activate the transistor switch operation of chip 28 and precipitate the discharge of capacitor 12 through detonator 16.

Sensor 18 preferably comprises a pressure-activated disk 34 of lead-zirconate titanate ceramic, such as PZT 4, which is temperature and humidity insensitive and exhibits good high frequency response. Disk 34 may be provided with a bypass resistor 36 to provide a current path to ground.

A plurality of series diodes 38, for example, type IN4004 may be placed as shown in line 22. Diodes 38 should have sufficient current rating to pass the charging current for capacitors 12. The will, however, prevent simultaneous partial or total discharge of the downstream capacitors 12, when the apparatus is energized.

Figure 3:
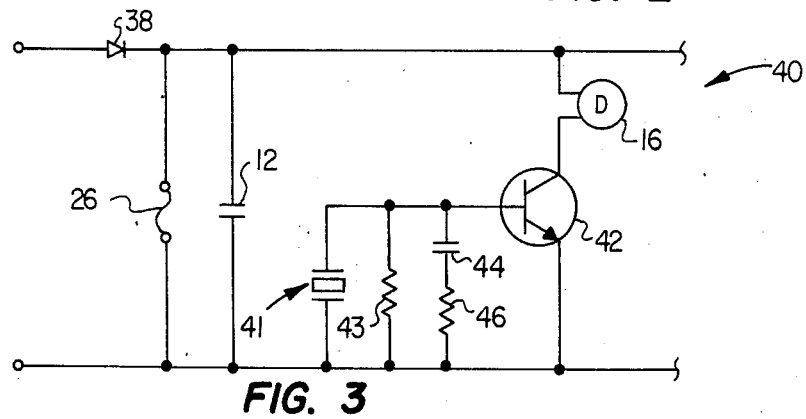
FIG. 3 is a modified circuit diagram of a phaser circuit in accordance with this invention.

FIG. 3 illustrates the circuit for a modified, somewhat simplier version of the previously described phaser circuit of this invention. Phaser circuit 40 is somewhat less sophisticated than the circuit of FIG. 2 as to the timing and switching of functions to be performed. When a voltage transient generated by a sensor 41 reaches a sufficient threshhold value, transistor 42 is activated to permit capacitor 12 to discharge through detonator 16. By-pass Resistor 43 provides a current path to ground. Time delay is governed by resistor 44 and capacitor 46. To insure that transistor 42 is not accidentally activated by the "arming voltage", the sensor and timing functions are made a part of the base-emitter circuit of transistor 42.

Figure 4:
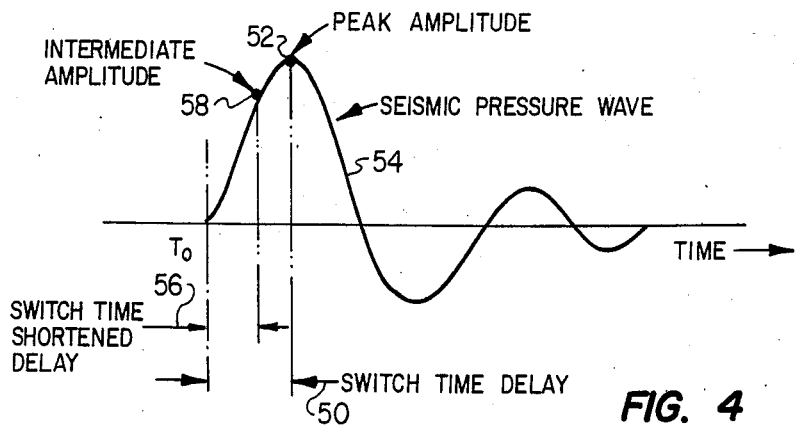
FIG. 4 is a graph showing the relationship between seismic pressure wave front and electronic switching time delay.

Since phaser 10 employs no mechanical sensing or switching features, there is no appeciable time delay introduced by any such components. Therefore, there is no need to physically separate the pressure sensor 18 and detonator 16 as required with mechanical switches such as employed in the Barnes patent referenced above. Thus, advance determination of formation acoustic velocity is not a prerequisite to design or operation of the device of this invention. However, because the timing and switching functions of phaser 10 are accomplished so rapidly, it may be assumed that switch 14 will close slightly before arrival at detanator 16 of the peak pressure value of the downwardly advancing wave front, thus preventing a maximum pressure wave reinforcement. FIG. 4 illustrates generally the wave form of the advancing seismic wave front. Assuming that at the time $T_o$ the seismic wave front impinges on and activates the sensor 18, a switch time delay 50 may be programmed into phaser 10, such that capacitor 12 discharges, firing the detonator 16 at the moment when peak amplitude 52 of seismic pressure wave 54 arrives at the charge. A shorter time delay 56 may alternatively be substituted and under certain circumstances prove beneficial by causing detonation to occur at some lesser intermediate value 58 of pressure wave 54. This will permit a brief build up of the pressure field surrounding the charge 21 connected to detonator 16 in order to further enhance the reinforcement of the downwardly advancing wave front. Empirical determination of the seismic wave form in the "near field" of the shot hole by separate experimentation will aid in refinement of the setting of the time delays 50 or 56 for maximum efficiency. Since each phaser circuit 10 functions independently, if any one such circuit should fail to explode its associated lump charge 21 the others will still function correctly.

In its preferred embodiment, particularly as exemplifies in FIG. 2, the expendable phaser circuit described is safe, reliable, accurate, and in expensive. It can be made substantially insensitive to variations in sonic signal amplitude and borehole temperature. The apparatus itself includes no power supply.

The apparatus of this invention may be employed in a shothole of any desired orientation ranging from vertical to horizontal, depending upon the nature of the formation geology to be investigated.

It should be recognized that the foregoing detailed description is illustrative only. Those skilled in this art will recognize that many modifications in circuit design and component selection may be made without departing from the scope of this invention as more particularly set forth in the appended claims.

What is claimed is:

1. Apparatus for firing an explosive charge in a formation so as to reinforce a pressure wave passing through said formation, said pressure wave having a dominant frequency of substantially determinable rise time to peak amplitude, comprising:
    (a) an electrically responsive detonator coupled to said charge;
    (b) a capacitor having a discharge circuit including said detonator;
    (c) means for charging said capacitor from a remote point;
    (d) an electronic switch connected so as to control the completion of said discharge circuit;
    (e) a pressure activated electro-acoustic sensor connected to said switch for generating a fast-rising voltage transient responsive to said pressure wave, said voltage transient being adapted to actuate said switch so as to discharge said capacitor and fire said detonator; and
    (f) timing means interposed between said sensor and said switch for delaying said voltage transient for a time interval in predetermined relation to said rise time.

2. Apparatus as claimed in claim 1 wherein said delay imposed by said timing means is substantially equal to said rise time.

3. A sequential shooting system for successively reinforcing a pressure wave explosively initiated within a formation, said pressure wave having a dominant frequency of substantially determinable rise time to peak amplitude, comprising:
    (a) a plurality of lump explosive charges disposed at spaced intervals within said formation, each of said charges being provided with an electrically-responsive detonator;
    (b) a like plurality of capacitors corresponding to said detonators and in whose discharge circuits said detonators are respectively included;
    (c) means for charging said capacitors from a remote point;
    (d) a plurality of electronic switches for controlling the completion of said capacitor discharge circuits;
    (e) a plurality of pressure - activated electroacoustic sensors connected respectively to said switches for generating successive fast rising voltage transients responsive to the advance of said pressure wave, said voltage transients being adapted to activate said switches sequentially so as to discharge said capacitors and fire said detonators; and
    (f) timing means interposed between each of said sensors and its associated switch for delaying each said voltage transient for an interval in predetermined relation to said rise time.

4. The method of geophysical prospecting wherein a seismic wave of substantially determinable rise time to peak amplitude is passed through a shothole so as to sequentially detonate a plurality of lump explosive charges disposed within said shothole at spaced intervals, each of said charges being provided with an electrically-responsive detonator, and wherein each of said detonators is fired by the discharge of a charged capacitor associated therewith, comprising the steps of:
    (a) connecting a plurality of electronic switches so as to control the completion of the respective discharge circuits of said capacitors;
    (b) causing said seismic wave to successively activate a plurality of electro-acoustic sensors connected respectively to said switches, thereby generating successive fast-rising voltage transients adapted to actuate said switches sequentially and discharge said capacitors; and
    (c) delaying each of said voltage transients prior to activating its associated switch by a time interval in predetermined relation to said rise time.

5. The method as claimed in claim 4 wherein said time interval is substantially equal to said rise time.

* * * * *